United States Patent

[11] 3,557,833

[72] Inventor Roger Gilmont
 Douglaston, N.Y.
[21] Appl. No. 721,709
[22] Filed Apr. 16, 1968
[45] Patented Jan. 26, 1971
[73] Assignee Roger Gilmont Instruments Inc.
 Great Neck, N.Y.
 a corporation of New York

[54] MICROMETRIC CAPILLARY VALVE WITH TAPERED PASSAGE
9 Claims, 7 Drawing Figs.

[52] U.S. Cl. .................................. 137/625.3,
 138/46; 251/205, 251/368
[51] Int. Cl. ............................... F16k 47/04,
 F15d 1/10
[50] Field of Search .......................... 231/205;
 137/625.3; 251/O-ring; 138/46

[56] References Cited
UNITED STATES PATENTS
1,476,232  12/1923  Zander .................. 251/205X 2,833,307  5/1958  Henderson ................. 251/205X
FOREIGN PATENTS
676,218  11/1964  Italy ..................... 137/625.3

Primary Examiner—Arnold Rosenthal
Attorney—James and Franklin

ABSTRACT: An adjustable valve for controlling fluid flow at appreciable rates comprises a tapered passage between inlet and outlet ports, in which passage an elongated member is axially slidable with appreciable clearance, thereby to vary the rate of fluid flow through said passage. In order to maintain the required members, radial orientation of the member within the passage, inwardly extending elements are provided in the passage which contact the outer surface of the member, while fluid flow clearances are defined between the member and the inner surface of the passage. The end of the passage remote from the member may be narrowed to define a seat with which the tip of the member cooperates to provide a positive-off feature.

INVENTOR
ROGER GILMONT
BY
James and Franklin
ATTORNEY

INVENTOR
ROGER GILMONT

BY James and Franklin
ATTORNEY

MICROMETRIC CAPILLARY VALVE WITH TAPERED PASSAGE

The present invention relates to an adjustable valve capable of providing precise and reproducible control of fluid flow of appreciable magnitude.

The precise and reproducible control of fluid flow of appreciable magnitude (e.g., between 1—150 cc./min. of standard air for a 1 p.s.i. pressure differential) is often of great importance in laboratory operations, both research and production. In the past, the devices used to control the fluid flow for such applications have been imprecise and unreliable. The initial adjustment of the fluid rate control member was largely empirical in nature and could not be reproduced at a later date to achieve the same rate of flow with the certainty and reproducibility required for precise scientific work, except by renewed empirical adjustment.

It is also important in adjustable valves of the type described to be able to control the rate of fluid flow over a relatively wide range of flow rates so that the valve may be used for many different applications. It is also very desirable to have a semilogarithmic relationship between the flow rate and the physical adjustment of the device, at least over a portion of the control range, because with such a relationship, a given fixed change in the valve setting, at any place in that range, will produce a given fixed percentage of change in the fluid flow rate. Because of operating conditions often experienced, a valve should be readily adaptable for use with corrosive fluids and within high vacuum applications.

I have already described in my earlier application Ser. No. 415,736, entitled, "Adjustable valve for Low Fluid Flow," now U.S. Pat. No. 3,325,685, an adjustable valve for use in controlling relatively low rates of fluid flow. With the valve device disclosed in said prior patent, precisely controlled laminar fluid flow is obtained for fluid flow rates in the range of between 10—100 cc./hr. of a fluid such as air. At higher flow rates, between 100—1,000 cc./hr. for air, the nature of the fluid flow becomes transitional between laminar and nonlaminar, and at still higher flow rates for 1,000—10,000 cc./hr. of air, orifice or needle valve flow results. Hence, the control of fluid flow becomes less precise at these higher flow rates.

The valve disclosed in said prior patent and the valve here disclosed are similar to the extent that each comprises an elongated rod received within a passageway and axially movable along the passageway. In both, the flow rate is determined by the extent to which the rod extends into the passage.

While the valve disclosed in said prior patent is highly effective for the calibrated controlling of low rates of fluid flow, it has been found that when the passage width, or member passage clearance, is increased sufficiently to permit more appreciable rates of fluid flow, the accurate and reproducible calibration characteristic of the valve deteriorates rapidly. What seems to be the case is that the constructional features of the valve of the prior patent which insure that the member is accurately centered in the passage are thoroughly effective only when the clearance between passage and member is minimal; when that clearance increases to more readily permit fluid flow, the member tends to vary in radial position within the passageway from one insertion to another. This occurs despite the fact that the clearance width is still properly defined as capillary; laminar flow of the fluid through the passageway is essential if there is to be an accurate correlation between the insertion position of the member and the rate of fluid flow.

It has been found that the fluid flow rate of a valve of the type described can be increased without sacrifice in facility and accuracy of measured control, and that the desired semilogarithmic relation between fluid flow rate and member insertion can be achieved at the same time, by providing a capillary clearance of desired comparatively great width between passage and member, which clearance is gradually tapered from one end of the passage to the other, and by providing untapered support surfaces in the passage which engage the member and keep it centered in the passage.

In a valve device constructed along these lines, in accordance with the present invention, it has been found that substantially laminar fluid flow can be obtained for flow rates of between 90—900 cc./hr. for a fluid such as air, transitional flow being obtained in the range of flow between 900 and 9,000 cc./hr. of air, and orifice type flow between 9,000 and 90,000 cc./hr. of air, or approximately 10 times the rate of fluid flow over which corresponding control was obtainable in the valve disclosed in said prior patent.

It is, therefore, a prime object of the present invention to provide a simple, sturdy and relatively inexpensive adjustable valve which is able to provide precise and reproducible control of fluid flow of appreciable magnitude over a relatively wide range of flow rates.

It is a further object of the present invention to provide an adjustable valve for precisely controlling the rate of fluid flow in which the relationship between mechanical adjustment and fluid flow, at least over a portion of the control range, is semilogarithmic in nature.

It is another object of the present invention to provide an adjustable valve device in which the fluid flow rate can be accurately controlled by an external setting of a valve member in a reproducible manner, such that whenever the valve member is set at a given setting, the fluid flow rate, under similar viscosity and pressure-differential conditions, will be substantially the same.

In accordance with the present invention, fluid flows through a tapered capillary passage defined between portions of an elongated rod and the inner diameter of a tapered section of a passage communicating between the fluid inlet and outlet ports. The rate of fluid flow is determined by the axial position of the rod within the tapered passage section. In order to provide effective centering of the rod within the tapered passage, the inner diameter of the tapered passage is provided with at least two radially inwardly projecting elements which extend along the axial length of the passage, the radially inner surfaces of said elements being nontapering relative to the axis of said passage. The outer diameter of the rod is of a dimension such that the rod will engage and be positioned by said nontapering, radially inner surfaces of said elements. In this manner, the accurate central orientation of the rod within the tapered passage is securely maintained while still permitting the free axial movement of the rod along the entire length of the passage. A tapered, substantially annular capillary flow region is thus defined between the inner surface of the passage and the outer surface of the rod, the annulus being interrupted at the regions at which the rod engages the radially inwardly projecting elements. The flow of fluid through the annular capillary regions is essentially laminar (capillary flow according to Poiseuille's law) and, consequently, is directly proportional to the pressure drop, and inversely proportional to the viscosity of the fluid.

In a specific embodiment of this invention, three equally circumferentially spaced, radially inwardly projecting elements are provided which extend along substantially the entire axial length of the tapered passage, substantially parallel to one another and to the central axis of the passage. In order to reduce frictional resistance to movement of the rod, the outer surface of which is curved, the radially opposed surfaces of the inwardly extending elements are flat, the distance between the flats accurately corresponding to the outer diameter of the elongated rod, thereby to produce essentially only tangential contact therebetween.

The positioning of the rod axially of the tapered passage may be accomplished in any appropriate manner, as through the use of a micrometerlike structure, the screw portion of which has a very fine thread, thereby permitting close and precise adjustment of the position of the rod within the passage, and hence comparably accurate control of the fluid flow rate. It has been found that with a simple construction of this type, a wide range of fluid flow control of up to 1,000:1 can readily be achieved.

In another aspect of the present invention, a seat is formed at one end of the tapered passage which is adapted to form a fluidtight sealing arrangement with a mating portion of the rod. In this manner, effective cutoff of fluid flow may be effected by moving the rod into engagement with the seat.

To the accomplishment of the above, and to such other objects as may hereinafter appear, the present invention relates to an adjustable valve construction as defined in the appended claims and as described in this specification, taken together with the accompanying drawings, in which:

Figure 1:
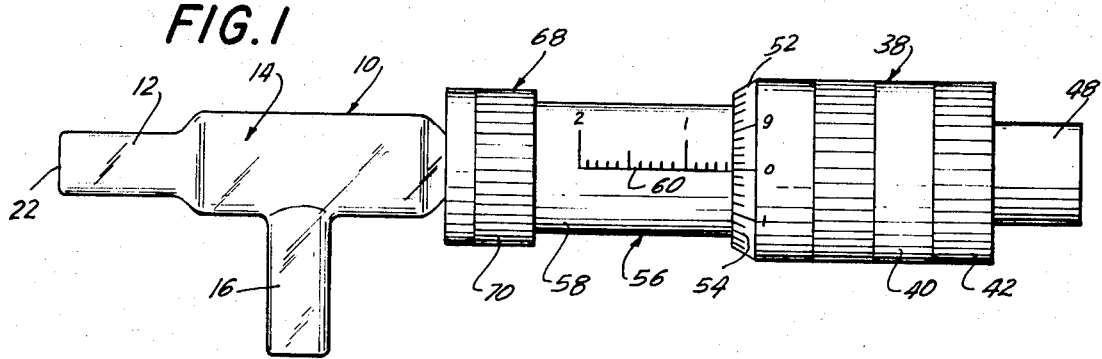
FIG. 1 is a side elevational view of an exemplary valve of the present invention.
Figure 2:
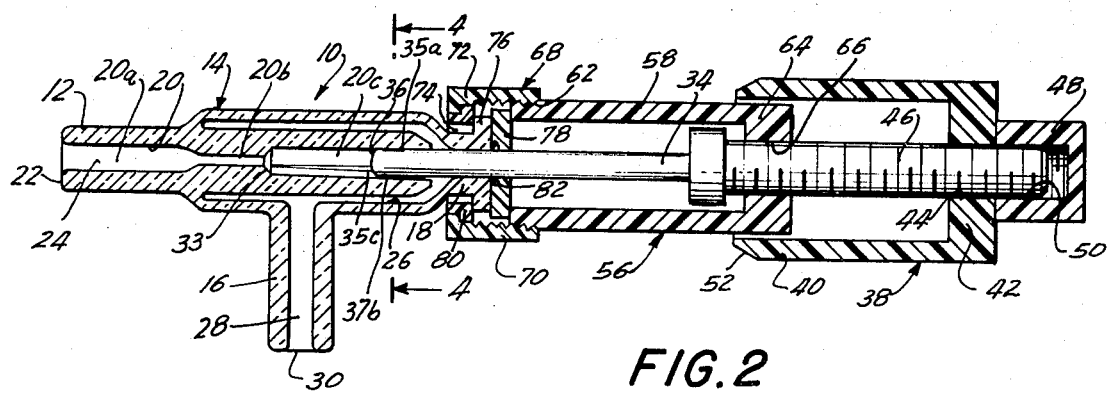
FIG. 2 is a side cross-sectional view of the embodiment of FIG. 1, taken along the line 2-2 of FIG. 4.
Figure 3:
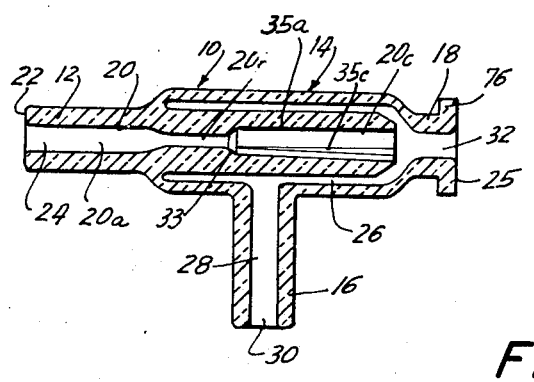
FIG. 3 is a side cross-sectional view of the fluid handling or body portion of the embodiment of FIG. 1.
Figure 4:
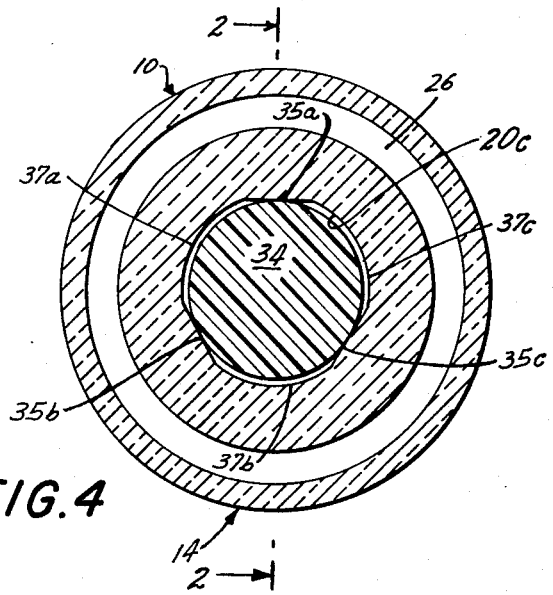
FIG. 4 is a cross-sectional view on an enlarged scale taken along line 4-4 of FIG. 2.

The adjustable valve of the embodiment of FIGS. 1—4 comprises a body generally designated 10, which may be formed completely of glass or other suitable material. Body 10 comprises a reduced diameter inlet section 12, a barrel portion 14 axially aligned therewith, an outlet portion 16 extending laterally from barrel portion 14, and a reduced diameter end portion 18, axially aligned with barrel portion 14. A passage generally designated as 20 extends through body 10 from one end 22 to the other end 25 thereof, the passage 20 opening into the end 22 to define an inlet port 24 and communicating via annular passage 26 with a passage 28 extending through portion 16, passage 28 ending at an outlet port 30 defined at the end of portion 16.

The ports 24 and 30 form the inlet and outlet ports of the valve, respectively, although it will be understood that the terms "inlet" and "outlet" can be applied interchangeably. However, for use of the valve as a vacuum leak, the input and output connections could preferably be reversed.

Portion 20a of the passage 20, adjacent the end 22, is of any convenient diameter and communicates with a narrower passage section 20b which, in turn, communicates with a wider passage section 20c, which is of a gradually tapered radius. An axial opening 32 is provided in end portion 18, which is in axial alignment and in effective communication with the tapered passage section 20c. The communicating section of passage 20 between passage sections 20b and 20c defines a frustoconical wall 33 defining, in turn, a valve seat.

A number of circumferentially spaced, precision formed elements extend radially inwardly from the wall of tapered passage section 20c and define surfaces such as the flats 35a—35c (FIG. 4), extending along substantially the entire length of tapered passage section 20c. Each of these surfaces 35a—35c extends substantially parallel to the central axis of tapered passage section 20c, so that while the inner surface proper of passage section 20c is tapered, the flats 35a—35c extending from the wall of passage section 20c define a number of spaced, nonradially tapering surfaces. In the embodiment shown, the flats 35a—35c are symmetrically arranged about the wall of passage section 20c, spaced from one another by approximately 120°.

The valve adjusting member is in the form of a precision ground, elongated plunger or rod 34 which passes through opening 32 and into tapered passage section 20c, and slides through passage section 20c along the surfaces defined by flats 35a—35. Rod 34 is made of a substance such as Teflon, or the like. Since the construction of body 10 and rod 34 is all of glass and Teflon, the valve is highly resistant to corrosion and may thus be readily utilized with corrosive fluids. The tip 36 of the rod 34 is arcuately formed so as to mate with seat 33 located at the end of passage section 20c when the rod 34 is moved axially to its position of maximum penetration therein. In this manner, a fluidtight seal is formed, thereby positively to turn the valve "off" and prevent the flow of fluid.

The radius of rod 34 is precisely formed to enable the rod to be axially positioned within the radially tapered passage section 20c and to slightly, tangentially engage the surfaces defined by flats 35a—35c, in a manner permitting the unimpeded axial movement of rod 34 along passage section 20c, so as to precisely vary the rate of fluid flow between the ports 24 and 30. Thus, the diameter of rod 34 is slightly smaller than that of the narrowest, unrestricted portion of tapered passage section 20c, i.e., near the end of passage section 20c nearest inlet port 24, and corresponds to the spacing between the flats 35a—35. In this manner, capillary fluid flow regions 37a—37c are formed between the outer surface of rod 34 and the inner wall of passage section 20c, intermediate the restrictions formed by the flats 35a—35c. The clearance so defined between rod 34 and the wall of passage section 20c varies in accordance with the axial position of the rod 34 within the passage section 20c as a result of the gradually increasing radius of the tapered passage section 20c. In a typical embodiment of this invention, the diameter of the rod 34 was approximately 0.124 inch, the diameter of passage section 20c varying along its length to define a clearance between rod 34 and the inner wall of passage section 20c varying between approximately 0.0005 inch at the narrow end of passage section 20c, to approximately 0.005 inch at the widest portion thereof. The axial length of passage section 20c was approximately 1.5 inches, the taper thus being approximately 0.003 inch per inch of passage length. This configuration was found to provide a semilogarithmic relationship between the rate of fluid flow and the axial length of the capillary annulus defined by the position of rod 34 within passage section 20c for an appreciable percentage of the control range. The clearance between the rod 34 and the wall of tapered passage section 20c thus varies from between approximately 0.4 percent and 4 percent of the diameter of rod 34, and exceeds 1 percent of the diameter of rod 34 for a major portion of the axial length thereof.

To achieve precise control of flow rate, it has been found necessary that rod 34 be accurately and uniformly positioned with respect to the inner wall of passage section 20c along the entire excursion of rod 34 within passage section 20c, so that the capillary flow regions defined between rod 34 and body 10 are uniformly reproducible as the valve is adjusted. This uniform positioning of rod 34 within passage section 20c is effected by the tangential engagement of rod 34 with the precisely formed surfaces defined by flats 35a—35c. It is not essential that rod 34 be axially centered within the passage section 20c, although usually this is desired. What is essential is that rod 34 always be positioned in the same way.

Any suitable mechanism may be employed for precisely positioning rod 34 along the axial length of passage section 20c. As here specifically disclosed in FIGS. 1—4, that adjustment structure comprises a sleeve generally designated as 38, having a skirt portion 40 and a hub portion 42, the latter having an internally threaded opening 44 which threadably engages a driving member 46 to which rod 34 is centrally secured. A locking nut 48 has an internally threaded opening 50 into which the outwardly projecting end of the driving member 46 is adapted to be received, the locking nut 48 permitting the sleeve 38 to be adjustably axially positioned relative to the driving member 46 and then locked in position. The left-hand end of the skirt 40 is provided with a beveled surface 52 on which circular micrometer graduations 54 are provided. The sleeve 38 and lock nut 48 may be formed of polypropylene or other suitable material.

A barrel generally designated as 56 is provided with a body portion 58 having axial micrometer-type graduations 60 adapted to cooperate with the left-hand edge of the sleeve 38 and the circular graduations 54 thereon. The left-hand end of barrel 56 has an externally threaded portion 62, and the right-hand end thereof has an end wall 64 provided with an internally threaded passage 66 through which the driving member 46 extends in threaded engagement. A nut, generally designated 68, is provided with an internally threaded body portion 70 within which the portion 62 of the barrel 56 is received, and is further provided with an end wall 72 having a central passage 74. The end 18 of the body 10 is provided with an outwardly extending flange 76 which is engaged by Teflon washer 78 pressed thereagainst by the left-hand end of the barrel 56, the flange 76 being pressed thereby against an adapter washer 80, which, in turn, is pressed against the end wall 72 of the nut 68. The barrel 56 and nut 68 may be formed of polypropylene, and the adapter washer 80 may be formed of polytetrafluoroethylene. A Viton rubber O-ring 82 is carried by the radially inner portion of washer 78 and sealingly engages the rod 34 which is slidable therethrough.

Thus, the mounting and positioning structure for rod 34 is reliably held in place on the right-hand end of the body 10. By rotating sleeve 38, rod 34 is moved axially into and along the passage section 20c.

In an exemplary embodiment of this invention, the rod 34 is axially moved along the entire length of passage section 20c through 20 complete revolutions of sleeve 38. Semilogarithmic flow regulation from 1—10 percent of maximum flow, corresponding to laminar fluid flow through elongated regions 37a—37c, was obtained for 14 turns of the 20-turn micrometer defined by sleeve 38 and barrel 56. Precise flow regulation from between 0.3—60 percent of maximum flow was obtained through 19.5 turns of the micrometer; 0.1-—100 percent of maximum flow being obtainable only in situations in which precise flow rate settings are not required. Thus, the valve of this invention provides for control of fluid flow over a range of as much as 1000:1 when precision of control is unnecessary; a range of 200:1 for precisely controlled fluid flow, and 10:1 for semilogarithmic control of fluid flow. For a gas such as air, laminar fluid flow, and thus, semilogarithmic flow control, was obtained for fluid flow rates of between approximately 90—900 cc./hr. with an applied pressure differential of 1 p.s.i. This corresponds to almost a tenfold increase in the rates correspondingly precision controlled by the valve device disclosed in my said prior patent.

Figure 5:
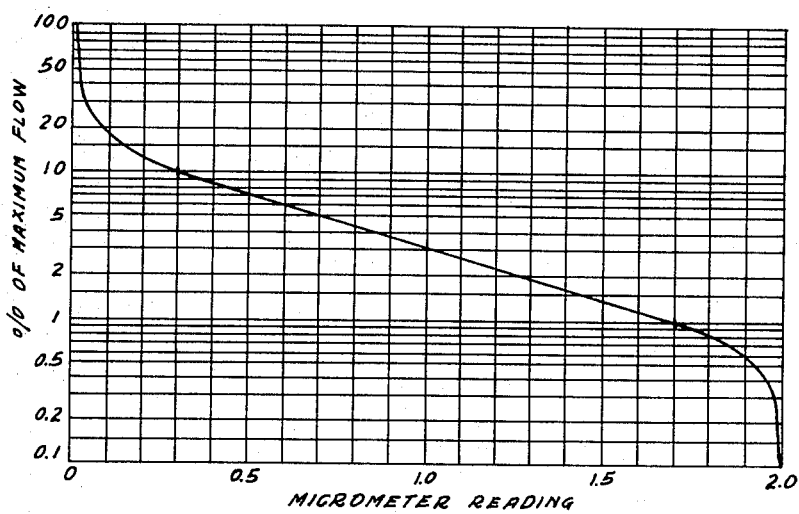
FIG. 5 is a semilogarithmic flow rate chart of percentage of maximum flow rate as a function of the valve micrometer setting.

In operation, the sleeve 38 is rotated until the tip 36 of rod 34 engages seat 33, thus closing the valve. The lock nut 48 is loosened and the position of sleeve 38 is adjusted until its zero indication on surface 52 is in alignment with the 2.0 line of the axial graduations 60 on the barrel 56. Once this adjustment is made, lock nut 48 is tightened to hold sleeve 38 in the adjusted position corresponding to substantially no fluid flow. To establish a desired rate of fluid flow, sleeve 38 is rotated to establish a micrometer setting corresponding to a percentage of maximum fluid flow (at a micrometer setting of 0.0) as read from a flow characteristic chart as in FIG. 5. It will be noted in the chart of FIG. 5 that the control of the flow rate is substantially semilogarithmic for micrometer settings between 0.3 and 1.7, corresponding to between 1 and 10 percent of maximum fluid flow. The flow rate for each micrometer setting is accurately predictable and remains substantially constant for repeated adjustments of the position of sleeve 38.

Figure 6:
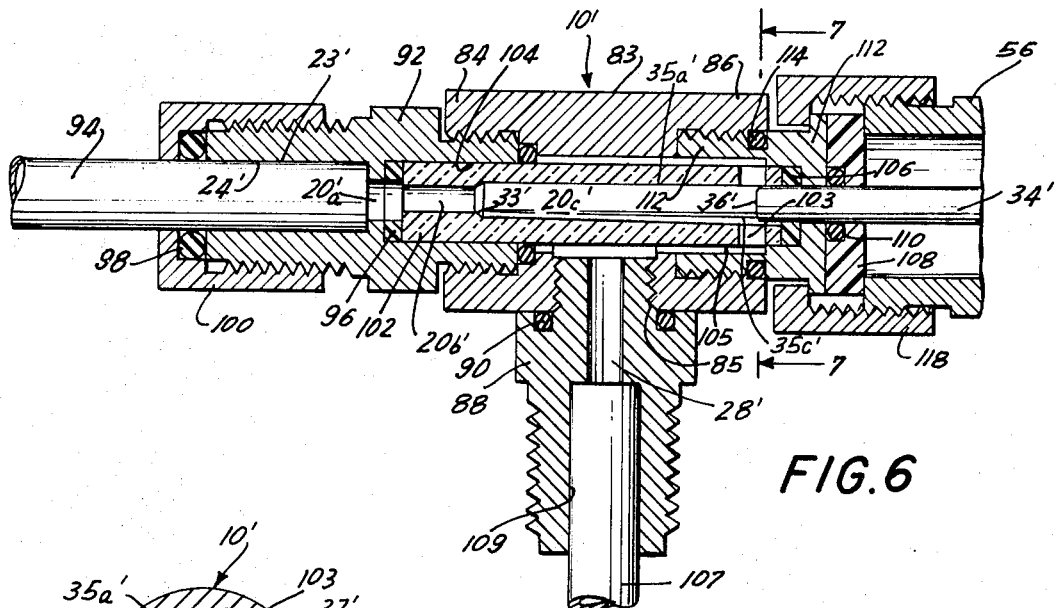
FIG. 6 is a side cross-sectional view of a second embodiment of this invention.
Figure 7:
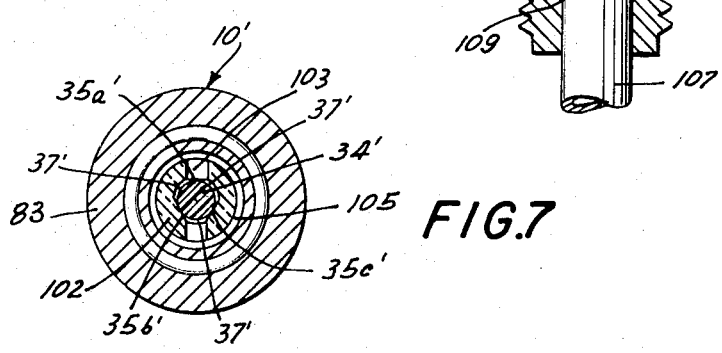
FIG. 7 is a cross-sectional view taken along line 7-7 of FIG. 6.

The embodiment of FIGS. 6 and 7 is functionally similar to the embodiment of FIGS. 1—4, but differs from the preceding embodiment in construction, and particularly in the fact that the valve body is formed primarily of metal.

Thus, the body 10' of the embodiment of FIGS. 6 and 7 comprises a metal tube 83 having internally threaded ends 84 and 86 and an internally threaded side opening 85 into which an outlet adapter 88 is screwed, a sealing rim 90 being interposed between the adapter 88 and the tube 83. An inlet bushing 92 is screwed into the end 84 of the tube 83, that bushing having an inlet orifice 24' into which a conduit 94 is snugly inserted. The end of conduit 94 communicates with passage section 20a', which, in turn, communicates with narrow passage section 20b'. A sealing washer 96 is interposed about the right-hand end of passage section 20a', and a sealing ring 98 is interposed between bushing 92 and an inlet closure member 100.

A glass tube 102 is received within an opening 104 provided at the right-hand end of bushing 92, the narrow passage section 20b' and the tapered passage section 20c' each extending through tube 102. A radial opening 103 communicates with the right-hand end of tapered passage section 20c' *and with an annular passage 105, which, in turn, communicates with passage 28' formed in adapter 88. An outlet conduit 107 is snugly received within an opening 109 formed in adapter 88 and communicates with passage 28'.*

The elongated rod 34' is mounted in a manner similar to that of the preceding embodiment and passes through aligned central openings provided in spaced sealing washers 106 and 108 into one end of tapered passage section 20c'. A sealing ring 110 is provided in a recess formed in washer 108 and is interposed between rod 34' and an adapter 112, which is screwed into the end 86 of tube 83, a sealing ring 114 being interposed therebetween. Sealing washer 108 is compressed between adapter 112 and a barrel 56, upon which nut 68 is screwed.

As in the preceding embodiment, a plurality of flats 35a', 35b' and 35c' (FIG. 7) are formed along the inner wall of glass tube 102 to provide precise uniform orientation or rod 34' along tapered passage section 20c'. The flats 35a'—35c' extend substantially along the length of passage section 20c' and are parallel to one another and to the central axis of passage section 20c'. The dimensional relationships between the diameter of rod 34', the diameter of tapered passage section 20c', and the positioning and spacing between the flats 35a'—35c' in the embodiment of FIGS. 6 and 7, are of the same nature as in the embodiment of FIGS. 1—4. Thus, once again, radial clearances 37' are defined between the rod 34' and the unrestricted portions of the wall of tapered glass tube 102 between the flats 35a'—35c', the total clearance varying between 0.0005 inch at the narrowest portion of passage section 20c' to 0.005 inch at the widest portion thereof. As a result, a capillary flow is produced in clearances 37', the rate of such flow being determined by the axial lengths thereof; and consequently, by the axial position of rod 34' within passage section 20c'. As before, the relation of the fluid flow rate to the rod position is substantially semilogarithmic over a portion of the control range. The contact between rod 34' and flats 35a'—35c' is essentially only tangential, thereby to permit the free axial movement of rod 34' along passage section 20c'.

When rod 34' is moved to its maximum insertion into passage section 20c', the rounded tip 36' engages the seat 33' to form an effective seal, thereby to close off fluid flow through the valve.

As a result of the constructions here disclosed in which a tapered capillary passage section 20c' having positioning flats formed along the wall of the tapered passage section is combined with a closely fitting precision-ground elongated rod, precise and reproducible control of relatively large fluid flows is achieved, this control being substantially semilogarithmic for a significant portion of the control range. A further feature of the disclosed constructions is the positive-off seal formed by the engagement of the end of the control rod and a seat defined at the restricted radial section of the fluid passage when the rod is moved to its extreme position in that passage.

The valve of this invention may be manufactured inexpensively, is exceptionally sturdy and reliable, and may be accurately adjusted in an extremely facile manner, with the assurance that for a given adjustment, the fluid flow rate established can be predicted with great reliability.

While but a limited number of embodiments of the present invention are here specifically disclosed, it will be apparent that many variations may be made therein, all within the scope of the invention as defined in the following claims.

I claim:

1. An adjustable valve, comprising a body having a passage communicating between a fluid inlet port and a fluid outlet port, at least a section of said passage having a tapered inner diameter and at least two circumferentially spaced elements extending radially inwardly from said body and axially along said passage section and terminating radially in surfaces which are substantially parallel to the axis of said passage section to define protrusions having nonradially tapering, engageable surfaces, and an elongated cylindrical member received in said passage and having an axially elongated smooth uninterrupted outer surface which engages and slides over said element surfaces, said element surfaces thereby effectively positioning said member within said passage, at least two axially tapered clearances being defined circumferentially between said elements and radially between said member and said body, the circumferential extent of said substantial axis-parallel surfaces engaged by said elongated member being only a small fraction of the circumferential extent of said tapered passage section, the total clearance between said member and said body varying from approximately 0.0005 to 0.004 inches at opposite ends of said tapered passage section.

2. The adjustable valve of claim 1, in which said element surfaces comprise flats arranged substantially equally circumferentially spaced about said passage section.

3. The adjustable valve of claim 2, in which said element surfaces comprise at least three said flats.

4. The adjustable valve of claim 2, in which said passage section defining a seat terminates in a radially reduced section, the end of said member being formed to snugly mate with said seat to form an effective seal in said passage section when said member is axially moved into engagement therewith.

5. The adjustable valve of claim 1, further comprising precision indicator means on said body operatively connected to said member and effective accurately to externally indicate the axial position of said member along said passage section.

6. The adjustable valve of claim 1, in which said passage section defining a seat terminates in a radially reduced section, the end of said member being formed to snugly mate with said seat to form an effective seal in said passage section when said member is axially moved into engagement therewith.

7. The adjustable valve of claim 6, in which said reduced radial section defines a frustoconical seat.

8. The adjustable valve of claim 1, in which said tapered passage section varies in diameter by approximately 0.003 inches per inch of its axial length.

9. The adjustable valve of claim 1, in which the equivalent diameter of said clearance is in excess of 1 percent of the diameter of said member for a major portion of the axial length of said member.